US009880948B2

United States Patent
Chappell et al.

(10) Patent No.: US 9,880,948 B2
(45) Date of Patent: *Jan. 30, 2018

(54) METHOD AND APPARATUS FOR BUS LOCK ASSISTANCE

(71) Applicant: INTEL CORPORATION, Santa Clara, CA (US)

(72) Inventors: Robert S. Chappell, Portland, OR (US); John W. Faistl, Hillsboro, OR (US); Hermann W. Gartler, Portland, OR (US); Michael D. Tucknott, Hillsboro, OR (US); Rajesh S. Parthasarathy, Hillsboro, OR (US); David W. Burns, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,203

(22) Filed: Dec. 19, 2016

(65) Prior Publication Data

US 2017/0097902 A1 Apr. 6, 2017

Related U.S. Application Data

(63) Continuation of application No. 13/538,463, filed on Jun. 29, 2012, now Pat. No. 9,524,263.

(51) Int. Cl.
*G06F 12/14* (2006.01)
*G06F 12/0862* (2016.01)

(52) U.S. Cl.
CPC ...... *G06F 12/1491* (2013.01); *G06F 12/0862* (2013.01); *G06F 12/1466* (2013.01); *G06F 2212/1052* (2013.01); *G06F 2212/602* (2013.01)

(58) Field of Classification Search
CPC ........ G06F 9/52; G06F 9/526; G06F 12/0862; G06F 12/1466; G06F 12/1491
See application file for complete search history.

(56) References Cited

U.S. PATENT DOCUMENTS

| 4,442,484 A | 4/1984 | Childs et al. |
| 5,283,870 A | 2/1994 | Joyce et al. |
| 5,535,345 A | 7/1996 | Fisch et al. |
| 5,581,782 A | 12/1996 | Sarangdhar et al. |
| 6,081,885 A | 6/2000 | Deao et al. |
| 6,587,964 B1 | 7/2003 | Brooks |

(Continued)

OTHER PUBLICATIONS

Office action from U.S. Appl. No. 13/538,463, dated Jan. 30, 2015, 8 pages.

(Continued)

*Primary Examiner* — Nimesh G Patel
(74) *Attorney, Agent, or Firm* — Nicholson De Vos Webster & Elliott LLP

(57) ABSTRACT

A method is described that includes detecting that an instruction of a thread is a locked instruction. The instruction also includes determining that execution of said instruction includes imposing a bus lock. The instruction also include executing a bus lock assistance function in response to said determining, said bus lock assistance function including a function associated with said bus lock other than implementation of a bus lock protocol.

25 Claims, 4 Drawing Sheets

(56) References Cited

U.S. PATENT DOCUMENTS

2003/0208647 A1* 11/2003 Kumar .................. G06F 9/3004
710/200
2009/0119459 A1 5/2009 Akkary et al.
2012/0072984 A1* 3/2012 Bair ........................ G06F 9/526
726/22

OTHER PUBLICATIONS

Final Office action from U.S. Appl. No. 13/538,463, dated Aug. 27, 2015, 8 pages.
Notice of Allowance from U.S. Appl. No. 13/538,463, dated Aug. 12, 2016, 7 pages.
Corrected Notice of Allowability from U.S. Appl. No. 13/538,463, dated Sep. 7, 2016, 4 pages.

* cited by examiner

METHOD AND APPARATUS FOR BUS LOCK ASSISTANCE

CROSS-REFERENCE TO RELATED APPLICATIONS

The present patent application is a continuation application claiming priority from U.S. patent application Ser. No. 13/538,463 filed Jun. 29, 2012, and titled: "Method and Apparatus for Bus Lock Assistance", which is incorporated herein by reference in its entirety.

FIELD OF INVENTION

The field of invention relates generally to the computing sciences, and, more specifically, to a method and apparatus for bus lock assistance.

BACKGROUND

Computing systems are able to concurrently process multiple tasks. Concurrent processing of multiple tasks can be effected in various ways. To name a few, different processors (such as different processing cores on a same semiconductor chip, or different processors implemented on different semiconductor chips) may execute their own respective threads over a same expanse of time. In a more fine-grained fashion, a multi-threaded processing core and/or instruction execution pipeline may concurrently execute different threads.

The ability to concurrently execute different threads leads to additional complexities when the processes of the different threads may use and/or rely on the same item of data. For example, if one thread changes an item of data, the system needs to ensure that another thread that seeks to access the same item of data will be provided the latest, updated version of the data rather than a stale, previous version of the data.

Locking is a technique that has been traditionally used by computing systems to address the need to handle operations made by one thread that could have an effect on the processes of other threads. Locking is a primitive of guaranteed system behavior that can be effected into the execution of a particular instruction. Specifically, for any instruction of a particular thread that is declared as a "locked" instruction, the system guarantees, to effect it's "bus lock protocol", that the effects of the instruction (such as a change made to a data item) are visible at once to other threads within the system. As such, threads that did not execute the instruction (but could nevertheless by impacted by the instruction) can, ideally, equally observe the effects of the instruction. Such behavior is described by those of ordinary skill as "the atomicity of a locked instruction".

Two ways to effect the atomicity of a locked instruction into the behavior of modern day processors and processing cores include: i) cache locks; and, ii) bus locks. For simplicity, hereafter, the term "processing core" will be used to refer to a processor or a processing core. Processing cores are understood to include a local cache. When an operation is to be performed on an item of data by one of the threads supported by a processing core, the processing core looks to its local cache before looking to system memory for the item of data. Items of data are organized into a cache through the use of "cache lines". A cache line typically includes more than one separately addressable item of data. In general, cache lock execution is much faster than bus lock execution. Cache locks delivers higher performance than bus locks.

In the case of a cache lock, a thread that executes a locked instruction is given full ownership of the sought for data item's cache line as part of the guaranteed system behavior. If the data item is not found in the cache a bus lock will commence. Alternatively, a bus lock will commence if the address of the sought for item of data crosses a cache line boundary. In this case, a cache snoop is not even attempted and the thread is not given full ownership of any cache line. In some processor implementations the memory type is also factored into whether or not a locked instruction is executed as a cache lock or a bus lock. Some processors might be designed such that all data items even if they are found in the cache have their atomicity handled as bus locks for some memory types.

In the case of a bus lock, all other threads are stopped until the operations upon the item of data by the thread that executed the locked instruction are complete. Here, the term "bus lock" is utilized even if a true "bus" does not exist between the core and system memory (e.g., the core is coupled to the system memory's memory controller through a point-to-point link).

The stopping of all other threads dramatically reduces the performance of the computing system. As such, programmers try to write code that avoids the occurrence of bus locks. Nevertheless, owing to the sheer complexity/impossibility of fully defining and comprehending instruction level behavior pre run-time, bus locks remain a run-time possibility. Also, the processor is typically designed to support bus locks for software backwards compatibility reasons.

In terms of designing software, or even multi-core shared data hardware designs, one possible design environment is to trigger the execution of special micro-code anytime a locked instruction is executed. Should the flow resulting from the locked instruction result in a bus lock, the micro-code will raise a flag that is detected by the software. Upon analysis of the state of the system leading up to the bus lock, software designers can try to re-design the software to effect a different system so as to avoid the bus lock, and/or, CPU designers can change their existing shared data intra core protocol logic design to prevent the bus lock in same/similar circumstances.

A problem with this approach is that the execution of the special micro-code effectively weighs on system performance, and, is executed even if a bus lock does not arise. That is, the micro-code will execute even if the normal flow results in a successful cache lock and not any bus lock.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
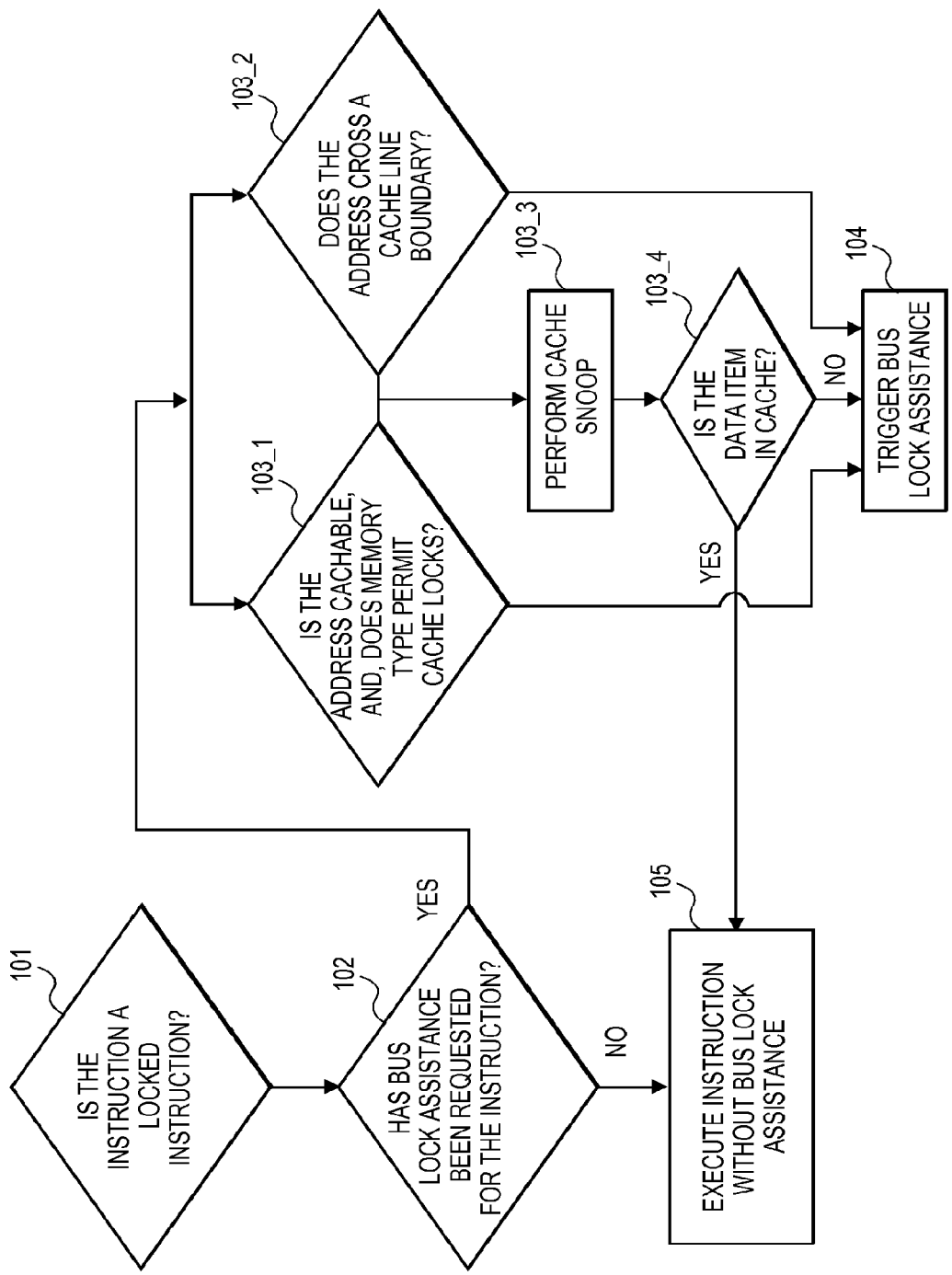
FIG. 1 shows a methodology for implementing bus lock assistance.

FIG. 1 shows an improved methodology 100 that can be performed by a processing core to trigger "bus lock assistance" procedures upon the occurrence of a bus lock but not a cache lock. As observed in the methodology of FIG. 1, an inquiry is made to see if the instruction is a locked instruction 101. If the instruction is not a locked instruction, the instruction is executed as a normal instruction 105. Here, typically, the programmer indicates to the core, in some fashion, that the instruction is a locked instruction. As described above, when the core is made aware that the instruction is a locked instruction, the core understands that it has to behave consistently with the special atomicity that is expected of a locked instruction.

The most common way to indicate to the core that an instruction is to be executed as a locked instruction, is to design the instruction format of the instruction set architecture of the core to support a bit or other information field that is recognized by the core as signifying that the instruction is a locked instruction. It also possible that some instructions are automatically executed as locked instructions (in this case, recognition that the instruction is a locked instruction is commensurate with the decoding and recognition of the instruction's opcode). In an embodiment, discussed in more detail with respect to FIG. 2, logic designed to recognize that the instruction is a locked instruction is placed inside the instruction decode stage of an instruction execution pipeline.

If the instruction is recognized as a locked instruction, another inquiry is made to see if bus lock assistance has been requested for the instruction 102. As described in more detail below, bus lock assistance may be implemented with, for example, special micro-code or dedicated logic circuitry that operates to "handle" the occurrence of a bus lock. The "handling" of a bus-lock may include, for example, raising a flag to software so that the software can be stopped, and/or, at least a snapshot of the system state at and/or leading up to the execution of the locked instruction can be analyzed to help programmers potentially rewrite code to avoid the bus lock in the future. Other special handling procedures are discussed in more detail further below.

In an embodiment, an indication as to whether bus lock assistance has been requested is specified in a control register or other machine specific register (MSR). As will be discussed in more detail below various entities within the system may desire the special handling procedures of bus lock assistance. As just one example, again, software that is under development may be configured to set a bit in MSR register space signifying to the core that bus lock assistance is being requested so that, as explained at length above, the occurrence of a bus lock can be flagged and the software potentially rewritten to avoid the bus lock under the particular condition (system state) surrounding the execution of the locked instruction. As described in more detail below, entities other than software (such as specialized blocks of hardware logic within the core) may also request bus lock assistance.

In one embodiment, the information written into control register space to request bus lock assistance may be specified on a thread-by-thread basis. For example, control register space may be dedicated to each thread executed by the core. At least a portion of the thread specific control register space may be used to indicate whether bus lock assistance has been requested for this specific thread. As such, any locked instructions executed by the particular thread will be understood to be requesting bus lock assistance until the request in control register space is cleared.

Note that in many configurations it is not uncommon to assign a virtual machine ("logical processor") to a particular thread. As such, being able to request bus lock assistance on a thread by thread basis effectively corresponds to assigning bus lock assistance on a virtual machine by virtual machine basis. Conceivably bus lock assistance can be assigned on a virtual machine by virtual machine basis even if virtual machines are not assigned to a specific thread (e.g., control register space having bus lock assistance information exists for each virtual machine).

As an example, consider a thread or virtual machine that is dedicated to the execution of a particular software application that is under development. As such, the register space for the thread/virtual machine is set to indicate bus lock assistance so that flags will be generated for any bus locks should they occur. If the thread or virtual machine is subsequently dedicated to another software application that is not under development or does not substantially execute instructions that could affect other threads, the same register space may be cleared so that bus lock assistance is not enabled for the other software application. For simplicity, the remainder of the present discussion will refer threads rather than virtual machines.

Referring again to FIG. 1, if the inquiry into the request for bus lock assistance 102 (e.g., a check into control register space such as MSR register space of the core) reveals that bus lock assistance has not been requested, execution of the instruction proceeds as normal without any bus lock assistance 105. Note that legacy code that was written for earlier cores that did not have the special bus lock assistance, or the ability to specially request bus lock assistance through control register space, might not have the capacity to affirmatively request bus lock assistance, and, in this case, operation would simply flow to normal instruction execution for such legacy code 105 (i.e., without any bus lock assistance). In this case, bus locks may occur without triggering special bus lock assistance for such code.

By contrast, if bus lock assistance has been requested, another inquiry is made to see if the data sought by the locked instruction is not cacheable or is supported by a memory type that does not allow cache locks 103_1, crosses a cache line boundary 103_2 or is not within the cache 103_3. If any of these conditions are true, the core recognizes that a bus lock will result which triggers the special bus lock assistance function.

Generally, in order for a thread to invoke a locked instruction so that an operation can be performed on data that other threads may have a sensitivity to, the initial locked instruction is a memory access type instruction. Memory access type instructions are understood by those of ordinary skill to more precisely be a data fetch instruction, where, at least for most if not all modern cores, the data that is to be fetched might be cached. Therefore, cache is looked to for the item of data before system memory. As such, in most if not all cases, the first locked instruction to initiate the core's locked atomicity behavior will be a memory access instruction.

The memory access specified by a memory access instruction typically specifies a memory type, a memory address and a data size. As is understood by those of ordinary skill, the memory type information can be analyzed by the core to understand whether the sought for data is cacheable and is supported by a memory type that allows cache locks 103_1. If the data is not cacheable or is supported by a memory type that does not allow cache locks, a bus lock will occur because the data by definition must be in system memory or a cache lock is otherwise not possible. Thus, if the bus lock assistance has been requested and a bus lock must occur, the special bus lock assistance will be triggered 104. If the data is cacheable but is not in the cache after a cache snoop is performed 103_3, again, a bus lock will be imposed because the data access will have to advance to system memory. In this case, the bus lock assistance function will also be triggered 104 if it has been requested. If the sought for data item is found within the cache by the cache snoop 103_3, execution of the thread advances forward 105 without triggering the bus lock assistance function.

Also, again as is understood by those of ordinary skill, the memory address and data size specified in the memory access instruction define whether a cache line boundary is being crossed by the access specified by the instruction. According to one approach, if the locked instruction's access crosses a cache line boundary 103_2, the data must be fetched from system memory and not cache (even if the sought for data is within the cache). Pushing the access out to system memory causes a bus lock, thus, bus lock assistance will be triggered 104 if it has been requested.

The data fetch is forced to system memory in the case of an access of a locked instruction that crosses a cache line boundary because the crossing of the cache line boundary means that the core would have to be given full ownership of more than one cache line. Here, recall that part of the atomicity behavior of a locked instruction is that the thread that executes the locked instruction is given full ownership of the cache line of the sought for data until completion of the operation.

Here, as is known by those of ordinary skill, deadlock situations can arise when a core maintains ownership of more than one cache line. Deadlock is a state where two different threads are each waiting for the other to take further action in order to continue forward execution. As it may not be possible to guarantee that a deadlock will not happen if the core were to receive full ownership of more than one cache line in the case where a locked instruction's access crosses a cache line boundary, the data access is pushed out to system memory. Thus, in the case where a locked instruction's access crosses a cache line boundary, the special bus lock assistance function 104 will be triggered if it has been requested.

Figure 2:
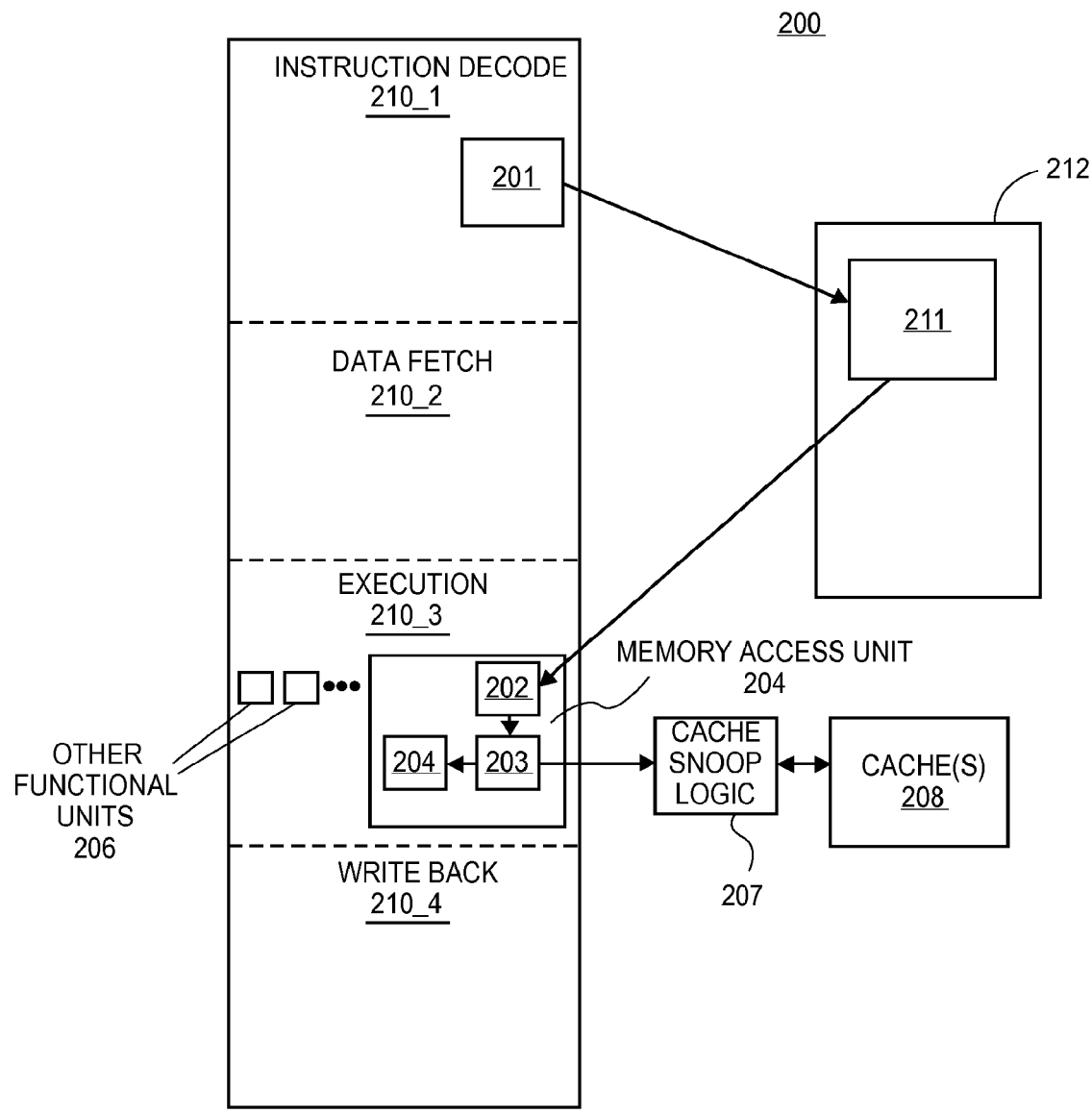
FIG. 2 shows an apparatus for implementing bus lock assistance.

FIG. 2 shows a processing core 200 designed to execute the methodology discussed above. As observed in FIG. 2, the processing core 200 includes an instruction execution pipeline 210 having an instruction decode stage 210_1, a data fetch stage 210_2, an execution stage 210_3 and a write back stage 210_4. The stages 210_1 through 210_4 are well known to those of ordinary skill and need not be described in detail here.

In an embodiment, the instruction decode stage 210_1 is embedded with first logic 201 that is designed to recognize that the instruction being processed by the instruction decode stage 210_1 is a locked instruction. In an embodiment, first logic 201 ("locked instruction identification logic circuitry") is designed to recognize a field of information (e.g., a bit) in the instruction format that signifies that the instruction is a locked instruction and/or recognize from the opcode of the instruction that the function performed by the instruction is to be executed as a locked instruction.

As observed in FIG. 2, the pipeline 210 has associated control information 211 that is kept in register space 212. In an embodiment, the control information includes information that is specific for the thread that the locked instruction is executed as part of, and, moreover, includes information that indicates whether bus lock assistance is to be implemented for any of the thread's locked instructions that result in a bus lock. In an embodiment control information 211 is swapped in/out anytime the pipeline 210 switches between threads.

As such, for example, should a thread that is currently being executed be switched out of the pipeline (e.g., because the thread is being put to sleep), state information 211 will be swapped out of register space 212 and state information specific to another thread that is being switched into the pipeline for active execution will be swapped into register space 212. The newly entered state information may or may not indicate bus lock assistance, thus, whether or not bus lock assistance has been requested can be a function of the thread switching activity of the core. The state information 211 can be originally configured by software and stored in model specific register (MSR) space or even system memory. Register space 212 may represent such MSR space. Alternatively, FIG. 2 can be construed so as not to actually depict MST register space, and the state information 211 is transferred into register space 212 from MSR space or system memory. Here, register space 212 is viewed as low level register space that is local to the pipeline 210.

The above discussion has been consistent with techniques for implementing bus lock assistance with thread level granularity. In other embodiments finer or lesser granularity may be effected. For example, according to an embodiment with lesser granularity, a setting that requests bus lock assistance in the (e.g., MSR) control register space of the core results in all locked instructions of all threads executed by the core to trigger bus lock assistance if a bus lock arises. For cores that have more than one pipeline, bus lock assistance may be similarly set for the entire core, or, on a pipeline by pipeline basis (e.g., control register space is reserved for each pipeline to indicate whether all locked instructions executed by a particular pipeline are to trigger bus lock assistance or not). Finer granularity can conceivably be achieved by statically marking a particular locked instruction, e.g., pre-runtime in the instruction format, with information that specifies whether the locked instruction is to be executed with bus locked assistance. For simplicity the remainder of the discussion will assume thread level granularity.

Referring back to FIG. 2, the first logic circuitry, upon recognizing the existence of the locked instruction, may also set a bit in the control information 211 of register space 212 to indicate that the instruction that is passing through the pipeline is a locked instruction. Second logic circuitry 202 ("bus lock assistance logic circuitry"), which may exist, for example, reside in a memory access functional unit (or simply, "memory execution unit") 213 that is to execute the locked instruction may look to the information 211 in register space 212 to understand that the instruction is a locked instruction and that bus lock assistance has been requested for the instruction.

Third logic circuitry 203 within the execution unit may then perform and/or at least oversee the logical operations 103_1, 103_2, 103_3 of FIG. 1. That is, logic circuitry 203 determines whether the sought for data is cacheable, is of a supported memory type that permits cache locks, and has an address that does not cross a cache line boundary and is in cache. If these conditions are met, the data item has successfully been fetched from cache without offending the locked instruction primitive, and, as such, the special bus lock assist functionality 204 is disabled or otherwise not invoked for the instruction. If any of these conditions are not met, the data item is not in cache or at least can't be fetched from cache without offending the locked instruction primitive. In this case, a bus lock will arise. As such, logic circuitry 203 triggers activation of the bus lock assistance functionality 204 which implements flow 104.

As stated above, the special bus lock assistance function 204 can be implemented with, for example, special micro-code and/or dedicated logic circuitry. The function itself 204 can take on varied forms depending on preferred implementation.

Some of the possible actions may include: i) preventing the bus lock from occurring and stopping run-time of the system altogether; ii) permitting the bus-lock to happen (i.e., permit normal execution flow 105 to continue) and raising a flag to software; iii) same as ii) above but also including the triggering of a "dump" of state information (e.g., including content of the pipeline's and/or core's registers) to system memory; iv) same as iii) but instead of saving the state information to system memory instead save it to a more secure location such as an on die internal SRAM or other secure mechanism dedicated to that thread which only that thread's software can access and analyze; v) activation of a different atomicity monitoring system (could be implemented via special micro-code and/or other firmware and/or dedicated logic circuitry) which allows execution of the instruction without following the bus lock protocol whereby if no atomicity violation is detected then the instruction execution completion occurs in a higher performance manner or if an atomicity violation is detected then instruction execution is aborted prior to completion and retried this time using execution flow 105; vi) same as v) above but also including raising a flag to software; vii) same as vi) but also including the saving of state information using the possible methods indicated in iii) or iv); viii) same as v), vi), or vii) but instead include another set of information in the control logic and register space 211 and 212 which allows the bus lock assistance logic to make from 1 up to a programmable number N attempts to complete the lock instruction without an atomicity violation before resorting to using normal execution flow 105.

Figure 3:
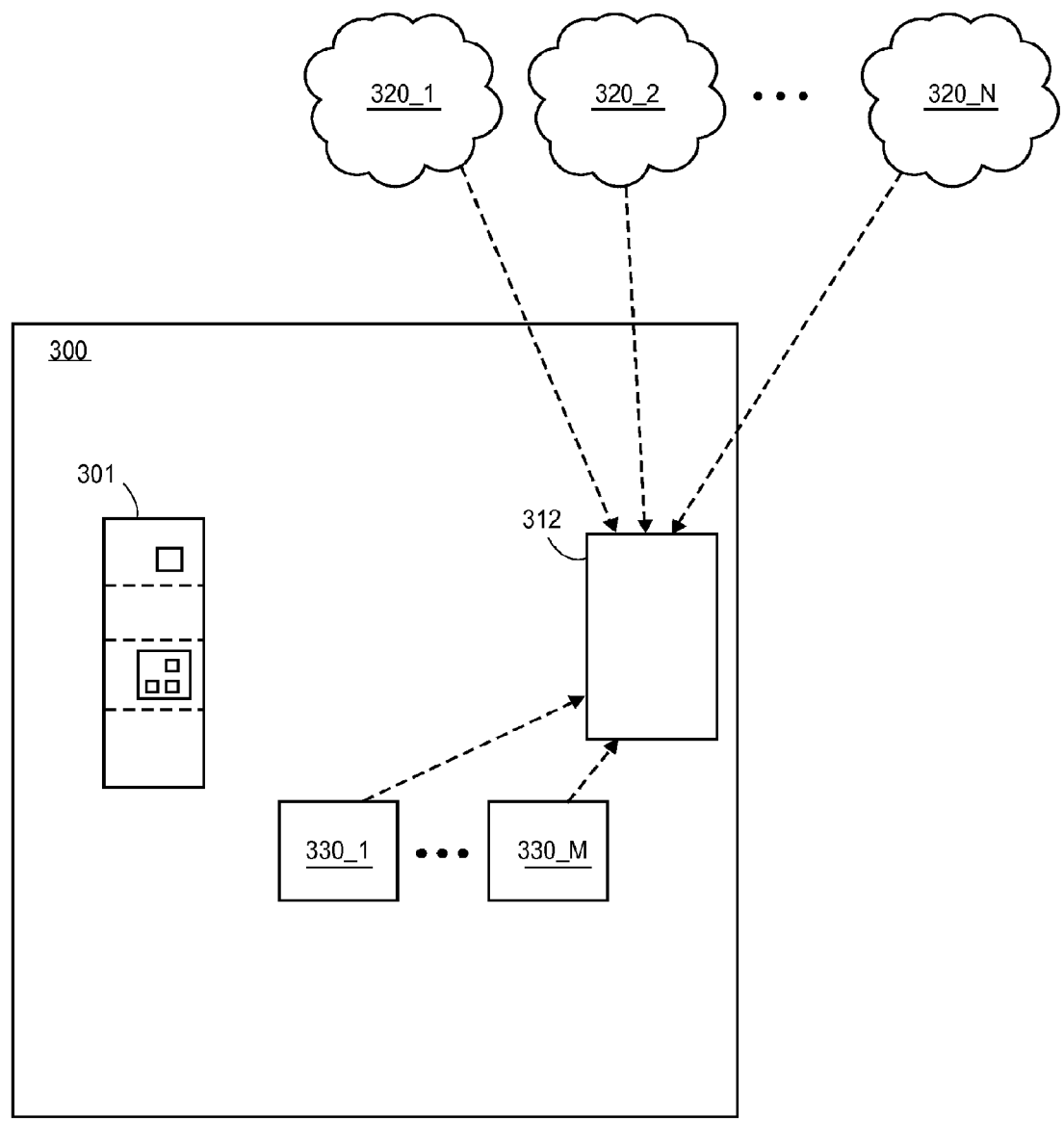
FIG. 3 shows different entities that may request bus lock assistance.

FIG. 3 pertains to the different entities that may request bus lock assistance. As observed in FIG. 3, a processing core 300 includes at least one pipeline 301 having the functionality described just above with respect to FIG. 2. Register space 312 corresponds to control register space (e.g., MSR space) where the indication of bus lock assistance is kept. As observed in FIG. 3, besides different software programs 320_1, 320_2 through 320_N (e.g., virtual machine monitor (VMM), operating system instance or application software program) being able to request bus lock assistance, bus lock assistance may also be requested by any of a plurality of hardware functions 330_1 through 330_M.

The hardware functions may include any of the following.

Any form of performance monitoring logic. Here, for whatever reason, the processor may be designed to allow the software programming or user to become aware that the software is using the performance lowering bus lock protocol even if they haven't knowingly asked for this information.

Because the bus lock protocol is very powerful and complex, any portion of the processor's logic which implements all of or even just a portion of the bus lock protocol might recognize and/or detect that in certain streams of instruction flow it needs help executing the normal bus lock flow and can then use/trigger the bus lock assistance capability as a mechanism to obtain micro-code and/or other specialized logic's aid.

The forward progress detection logic for a thread or any other thread in the processor, even from a different core, might detect it is unable to adequately access memory for any address value whether or not it is associated with the address being protected by the bus lock (e.g., due to extremely frequent and heavy usage of the bus lock protocol). Such forward progress detection logic then it can ask all threads to use bus lock assistance so that micro-code and/or other dedicated logic is activated to ensure fair memory access to all logical processors (aka threads).

Any new or existing feature/capability when being used might want bus locks to be handled in a special manner under any or some limited specific circumstances and, as such, can ask for bus lock assistance so that micro-code and/or other dedicated logic can be used to give their respective bus locks special treatment.

Some form of security logic or virus/malware detection logic might want to leverage the bus lock assistance capability to branch into a micro-code flow, and/or activate dedicated logic, and/or execute specialized assembly language code that ensures security and/or handles any sort of security threat created by malicious code (for example virus/malware/works/etc.).

As implementation of the entire bus lock protocol may involve logic/functionality which extends outside of the processor to other platform components such as the chipset or even other processors in a multi-processor system may request bus locks to be handled in a special way some or all of the time and the bus lock assistance capability can be requested by hardware/firmware external to any core in the system.

Figure 4:
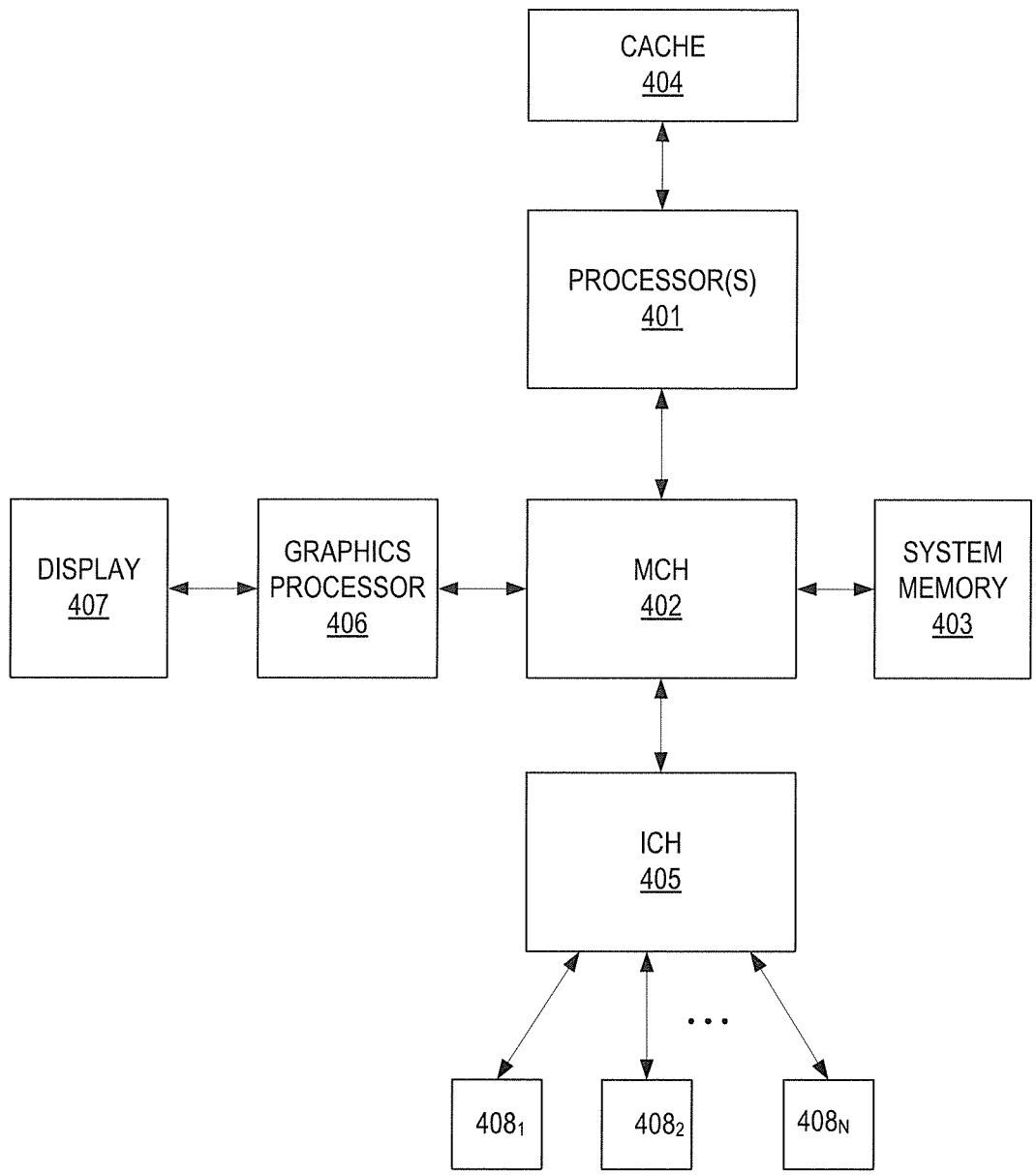
FIG. 4 shows an exemplary computing system.

A processing core having the functionality described above can be implemented into various computing systems as well. FIG. 4 shows an embodiment of a computing system (e.g., a computer). The exemplary computing system of includes: 1) one or more processing cores 401 that may be designed to include two and three register scalar integer and vector instruction execution; 2) a memory control hub (MCH) 402; 3) a system memory 403 (of which different types exist such as DDR RAM, EDO RAM, etc); 4) a cache 404; 5) an I/O control hub (ICH) 405; 6) a graphics processor 406; 7) a display/screen 407 (of which different types exist such as Cathode Ray Tube (CRT), flat panel, Thin Film Transistor (TFT), Liquid Crystal Display (LCD), DPL, etc.) one or more I/O devices 408.

The one or more processing cores 401 execute instructions in order to perform whatever software routines the computing system implements. The instructions frequently involve some sort of operation performed upon data. Both data and instructions are stored in system memory 403 and cache 404. Cache 404 is typically designed to have shorter latency times than system memory 403. For example, cache 404 might be integrated onto the same silicon chip(s) as the processor(s) and/or constructed with faster SRAM cells whilst system memory 403 might be constructed with slower DRAM cells. By tending to store more frequently used instructions and data in the cache 404 as opposed to the system memory 403, the overall performance efficiency of the computing system improves.

System memory 403 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 403 prior to their being operated upon by the one or more processor(s) 401 in the implementation of a software program. Similarly, data that a software program determines should be sent from the computing system to an outside entity through one of the computing system interfaces, or stored into an internal storage element, is often temporarily queued in system memory 403 prior to its being transmitted or stored.

The ICH 405 is responsible for ensuring that such data is properly passed between the system memory 403 and its appropriate corresponding computing system interface (and internal storage device if the computing system is so designed). The MCH 402 is responsible for managing the various contending requests for system memory 403 access amongst the processor(s) 401, interfaces and internal storage elements that may proximately arise in time with respect to one another.

One or more I/O devices 408 are also implemented in a typical computing system. I/O devices generally are responsible for transferring data to and/or from the computing system (e.g., a networking adapter); or, for large scale non-volatile storage within the computing system (e.g., hard disk drive). ICH 405 has bi-directional point-to-point links between itself and the observed I/O devices 408.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   detecting that a first instruction and a second instruction are locked instructions;
   determining that execution of the first instruction and the second instruction each include imposing an initial bus lock; and
   executing a bus lock assistance function in response to the determining, wherein the bus lock assistance function comprises:
   preventing the initial bus lock from being imposed for the first instruction, and
   permitting the initial bus lock to be imposed for the second instruction and raising a flag to indicate the initial bus lock is permitted.

2. The method of claim 1, wherein the determining that the execution of the first instruction and the second instruction each includes imposing the initial bus lock includes determining that a data item to be fetched by each of the first instruction and the second instruction is not cacheable.

3. The method of claim 1, wherein the determining that the execution of the first instruction and the second instruction includes imposing the initial bus lock includes determining that a memory type of each of the first instruction and the second instruction does not permit a cache lock.

4. The method of claim 1, wherein the determining that the execution of the first instruction and the second instruction includes imposing the initial bus lock includes determining that a data item to be fetched by each of the first instruction and the second instruction is not within a cache.

5. The method of claim 1, wherein the determining that the execution of the first instruction and the second instruction includes imposing the initial bus lock includes determining that an address of a data item to be fetched by each of the first instruction and the second instruction crosses a cache line boundary.

6. The method of claim 1, wherein the bus lock assistance function further comprises preventing a bus lock protocol from being followed.

7. The method of claim 1, further comprising detecting that bus lock assistance has been enabled for the first instruction as a pre-condition to preventing the initial bus lock from being imposed for the first instruction, and detecting that bus lock assistance has been enabled for the second instruction as a pre-condition to permitting the initial bus lock to be imposed for the second instruction and raising the flag.

8. The method of claim 1, wherein the bus lock assistance function further comprises raising the flag to software to stop the software.

9. An apparatus comprising:
   instruction identification circuitry to identify when a first instruction and a second instruction are locked instructions;

first circuitry to determine if the first instruction and the second instruction are each to impose an initial bus lock when executed; and second circuitry to trigger a bus lock assistance function when the first instruction and the second instruction are to each impose the initial bus lock when executed, wherein the bus lock assistance function is to:

prevent the initial bus lock from being imposed for the first instruction, and permit the initial bus lock to be imposed for the second instruction and cause a flag to be raised to indicate the initial bus lock is permitted.

10. The apparatus of claim 9, wherein at least the instruction identification circuitry is embedded within an instruction execution pipeline.

11. The apparatus of claim 10, wherein the instruction identification circuitry is embedded within a stage of the instruction execution pipeline that performs instruction decoding.

12. The apparatus of claim 9, wherein the first circuitry is embedded within a memory execution unit of an instruction execution pipeline.

13. The apparatus of claim 9, wherein the second circuitry is embedded within a memory execution unit of an instruction execution pipeline.

14. The apparatus of claim 9, further comprising first register space that stores first information indicating if bus lock assistance has been enabled for the first instruction and the second instruction, and bus lock assistance circuitry to read the first information.

15. The apparatus of claim 14, further comprising second register space that stores second information to indicate whether the first instruction is a bus lock instruction and the second instruction is a bus lock instruction, the instruction identification circuitry to write to the second register space.

16. The apparatus of claim 9, further comprising third circuitry to:

detect that bus lock assistance has been enabled for the first instruction as a pre-condition to preventing the initial bus lock from being imposed for the first instruction, and detect that bus lock assistance has been enabled for the second instruction as a pre-condition to permitting the initial bus lock to be imposed for the second instruction and raising the flag.

17. The apparatus of claim 9, wherein the bus lock assistance function further is to prevent a bus lock protocol from being followed.

18. The apparatus of claim 9, wherein the bus lock assistance function further is to raise the flag to software to stop the software.

19. A non-transitory machine readable medium containing program instructions that when processed by a processing core causes a method to be performed, the method comprising:

detecting that a first instruction and a second instruction are locked instructions;

determining that execution of the first instruction and the second instruction includes imposing an initial bus lock; and executing a bus lock assistance function in response to the determining, wherein the bus lock assistance function comprises:

preventing the initial bus lock from being imposed for the first instruction, and permitting the initial bus lock to be imposed for the second instruction and raising a flag to indicate the initial bus lock is permitted.

20. The non-transitory machine readable medium of claim 19, wherein the determining that the execution of the first instruction and the second instruction each includes imposing the initial bus lock includes determining that a data item to be fetched by each of the first instruction and the second instruction is not cacheable.

21. The non-transitory machine readable medium of claim 19, wherein the determining that the execution of the first instruction and the second instruction includes imposing the initial bus lock includes determining that a memory type of each of the first instruction and the second instruction does not permit a cache lock.

22. The non-transitory machine readable medium of claim 19, wherein the determining that the execution of the first instruction and the second instruction includes imposing the initial bus lock includes determining that a data item to be fetched by each of the first instruction and the second instruction is not within a cache.

23. The non-transitory machine readable medium of claim 19, wherein the determining that the execution of the first instruction and the second instruction includes imposing the initial bus lock includes determining that an address of a data item to be fetched by each of the first instruction and the second instruction crosses a cache line boundary.

24. The non-transitory machine readable medium of claim 19, wherein the bus lock assistance function further comprises raising the flag to software to stop the software.

25. The non-transitory machine readable medium of claim 19, wherein the method further comprises detecting that bus lock assistance has been enabled for the first instruction as a pre-condition to preventing the initial bus lock from being imposed for the first instruction, and detecting that bus lock assistance has been enabled for the second instruction as a pre-condition to permitting the initial bus lock to be imposed for the second instruction and raising the flag.

* * * * *